United States Patent [19]

Buding et al.

[11] Patent Number: 4,565,614
[45] Date of Patent: Jan. 21, 1986

[54] POLYMER MIXTURES AND CO-VULCANIZATES PRODUCED THEREFROM

[75] Inventors: Hartmuth Buding, Dormagen; Zsolt Szentiványi; Joachim Thörmer, both of Leverkusen, all of Fed. Rep. of Germany

[73] Assignee: Bayer Aktiengesellschaft, Leverkusen, Fed. Rep. of Germany

[21] Appl. No.: 657,536

[22] Filed: Oct. 4, 1984

[30] Foreign Application Priority Data

Oct. 14, 1983 [DE] Fed. Rep. of Germany ....... 3337397

[51] Int. Cl.$^4$ .............................................. C08F 2/46
[52] U.S. Cl. ................................... 522/112; 525/192; 525/194; 525/199
[58] Field of Search ....................... 525/199, 192, 194; 204/159.2, 159.14

[56] References Cited

U.S. PATENT DOCUMENTS 3,700,637 10/1972 Finch, Jr. ............................ 525/339
4,251,432 2/1981 Martin ................................ 525/199

Primary Examiner—Jacob Ziegler
Attorney, Agent, or Firm—Connolly and Hutz

[57] ABSTRACT

Co-vulcanizates are produced from mixtures of (a) from 95 to 5% by weight of fluoroelastomers and (b) from 5 to 95% by weight of elastomers which contain nitrile groups and have from 25 to 140 nitrile-nitrogen atoms and less than 35 double bonds per 1000 carbon atoms, and (c) conventional mixture ingredients, the percentages relating to the sum total of (a) and (b). The co-vulcanizates are suitable for the production of seals and other rubber articles, in particular for areas of use which impose exacting requirements.

5 Claims, 2 Drawing Figures

POLYMER MIXTURES AND CO-VULCANIZATES PRODUCED THEREFROM

This invention relates to vulcanisable polymer mixtures of fluoroelastomers and substantially saturated elastomers containing nitrile groups, and to the covulcanisates produced therefrom by peroxidic cross-linking.

Fluoroelastomers are special rubbers which are stable to heat and resistant to chemicals, steam and hot water, and which in particular exhibit only a slight swelling in hydrocarbons. They are produced by polymerising or copolymerising highly-fluorinated or perfluorinated monomers and they may be cross-linked by means of peroxides. Vulcanisates produced therefrom have an average strength.

Fluoroelastomers are described in, for example, German Offenlegungsschrift Nos. 1,655,010; 1,795,819 and 2,836,296 and in European Offenlegungsschrift Nos. 77 998, 48 308 and 99 079.

Substantially saturated elastomers which contain nitrile groups are obtained, for example, by hydrogenating nitrile rubbers (butadiene-acrylontrile copolymers). The vulcanisates produced therefrom are distinguished by a considerable strength.

Elastomers of this type are known, for example from U.S. Pat. No. 3,700,637 and German Offenlegungsschrift Nos. 2,539,132 and 2,913,992.

Surprisingly, it has now been found that it is possible to produce mixtures from fluoroelastomers and substantially saturated elastomers containing nitrile groups, which mixtures may be cross-linked peroxidically or by radiation to produce covulcanisates having outstanding properties.

Thus, the present invention provides mixtures of (a) from 95 to 5% by weight, preferably from 70 to 10% by weight of fluoroelastomers and (b) from 5 to 95% by weight, preferably from 30 to 90% by weight of elastomers which contain nitrile groups and have from 25 to 140 nitrile nitrogen atoms per 1000 carbon atoms and less than 35 double bonds, preferably less than 12 double bonds and in particular less than 2 double bonds, per 1000 carbon atoms, and (c) conventional mixture ingredients, the percentages relating to the sum total to the sum total of (a) and (b).

This invention also provides co-vulcanisates which are obtained from the above-mentioned mixtures by peroxidic cross-linking or radiation cross-linking.

The fluoroelastomers contain the following as monomers, for example: tetrafluoroethylene, vinylidene fluoride, tetrafluoropropene, pentafluoropropene, hexafluoropropene and perfluoromethyl-perfluorovinylether and optionally also non-fluorinated monomers, such as ethylene and propene, or small quantities of bromided or iodided olefines. The fluorine contents amount to from 50 to 71% by weight and the molar weights $M_w$ are from 10,000 to 10,000,000.

The starting materials for the production of the substantially saturated elastomers containing nitrile groups are preferably nitrile rubbers and from 10 to 48% by weight of (meth)acrylonitrile from 50 to 85% by weight of a conjugated diene having from 4 to 9 carbon atoms and from 0 to 30% by weight of a third monomer, for example (meth)acrylic acid, (meth)acrylic acid alkylester or vinyl acetate which are hydrogenated, for example according to DE-OS No. 25 39 132.

The nitrile rubbers preferably consist of from 48 to 15% by weight of acrylonitrile and from 52 to 85% by weight of butadiene or isoprene.

Conventional ingredients of a rubber mixture are known to those skilled in the art. These are, for example fillers, plasticizers, anti-agers, processing auxiliaries, pigments, acid acceptors and vulcanisation chemicals, while peroxides are used for the vulcanisation of the rubber mixture according to the present invention.

Examples of suitable peroxides are the following:
dialkyl peroxides, ketal peroxides, aralkyl peroxides, peroxyethers and peroxyesters. The following are preferably used: di-tert.-butyl peroxide, bis-(tert.-butylperoxyisopropyl-benzene), dicumyl peroxide, 2,5-dimethyl-2,5-di(tert.-butylperoxy)-hexane, 2,5-dimethyl-2,5-di-(tert.-butylperoxy)-hexene-(3), 1,1-bis(tert.-butylperoxy)-3,3,5-trimethylcyclohexane, benzoylperoxide, tert.-butylcumylperoxide or tert.-butylperbenzoate.

The quantitites of peroxide are from 1 to 15% by weight, preferably from 2 to 4% by weight, based on the solid rubber.

Generators of high-energy electromagnetic rays are suitable as sources for the radiation cross-linking, such as X-rays and $\gamma$-rays, as well as generators of electron beams.

Surprisingly, the co-vulcanisates exhibit superadditive values for the strengths, see FIG. 1. They also exhibit a very slight swelling in liquid hydrocarbons (see FIG. 2) and an outstanding property spectrum in the other essential rubber properties. Therefore, they are suitable for the production of seals and other rubber articles, in particular in areas of use in which exacting requirements are imposed as regards strength, tear propagation resistance, swelling resistance and mould releasing ability, for example in the production and use of rubber articles for the exploration and extraction of crude oil, in particular in the off-shore field.

Figure 1:
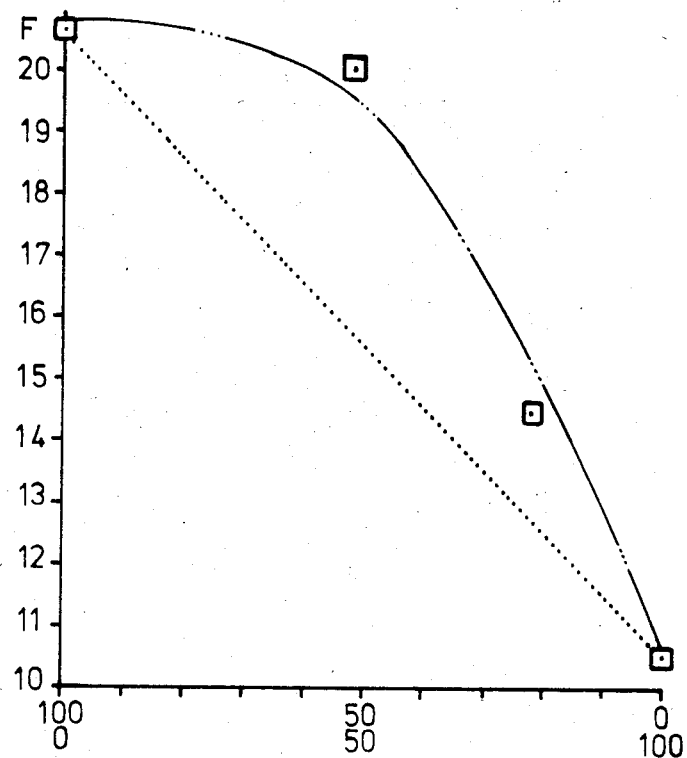
FIG. 1 shows the dependence of the strength F on the composition of the co-vulcanisate.

In FIG. 1, the strength F[MPa] is plotted against the composition, the values for % by weight of polymer, based on total polymer, being determined. The content of fluoroelastomer increases continuously from the left-hand side (0% by weight) to the right-hand side (100% by weight). The content of substantially saturated elastomers containing nitrile groups decreases accordingly. The dotted line represents the expected course obtained from the known strengths of pure elastomers, based on the respective mixture.

Figure 2:
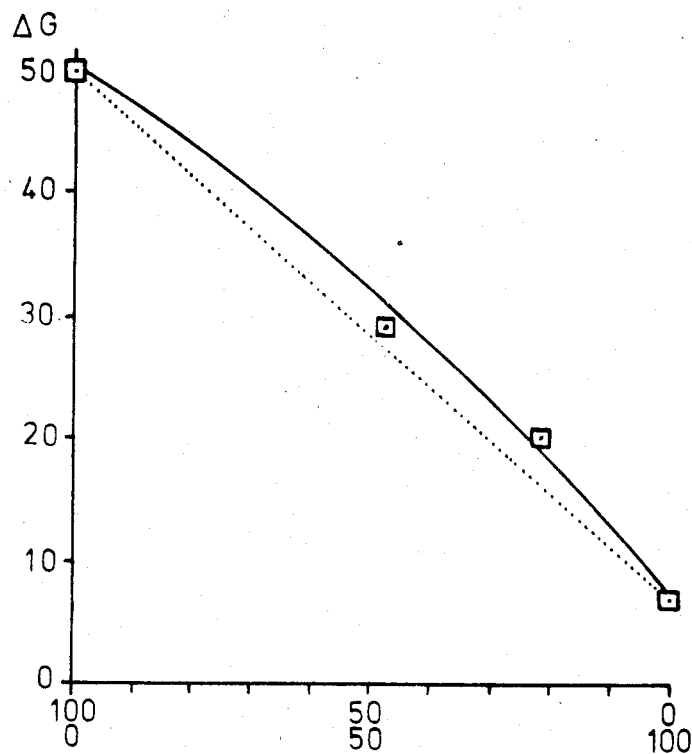
FIG. 2 shows the dependence of the swelling $\Delta G$ on the composition of the co-vulcanisate.

In FIG. 2, the swelling $\Delta G$ in % in ASTM fuel C at room temperature after seven days is plotted in a corresponding manner against the composition.

The elastomers tested for FIGS. 1 and 2 are those of Example 1.

EXAMPLE

The following base mixtures I and II were produced in a 1.3 liter laboratory kneader at 60° C. operating at 36 r.p.m. and under a stamping pressure of 8 bars.

|  | Parts by weight |
|---|---|
| Mixture I | |
| HNBR* | 100 |
| Carbon black 550 | 20 |

-continued

| | Parts by weight |
|---|---|
| Carbon black 765 | 40 |
| Magnesium oxide | 8 |
| Calcium oxide | 3 |
| Distyryldiphenylamine | 1 |
| Nickeldibutyldithiocarbamate | 1 |
| Triallylcyanurate (80% by weight) | 1.5 |
| Bis-(tert.-butylperoxyisopropyl-benzene) (40% by weight) | 5.0 |
| Mixture II | |
| FKM** | 100 |
| Pyrogenic silica (130 m$^2$/g acc. to BET) | 20 |
| Calcium oxide | 3 |
| Triallylcyanurate (80% by weight) | 1.3 |
| Bis-(tert.-butylperoxyisopropylbenzene) (40% by weight) | 1.5 |

*Hydrogenated acrylonitrile-butadiene copolymer having a content of acrylontrile of 34% by weight, a degree of hydrogenation of 99% and a Mooney viscosity ML at 100° C. (1 + 4) of 75

**Fluorine rubber having a fluorine content of 64% by weight, a specific weight 1.81 g/cm$^3$ and a Mooney viscosity ML at 121° C. (1 + 10) of 60.

Using the base mixtures I and II, blends were produced on a laboratory roller ($\phi$150 mm, 24 r.p.m., 1.2 friction) at 40° C. then vulcanised at 170° C. for 20 minutes and annealed at 175° C. for 5 hours (standard rod 3a).

The following Table gives the results of the vulcanisates and co-vulcanisates.

| | | | | |
|---|---|---|---|---|
| Mixture I (parts by weight) | 100 | 60 | 30 | — |
| Mixture II (parts by weight) | — | 40 | 70 | 100 |
| % by weight of HNBR, based on total rubber | 100 | 51.2 | 23.1 | 0 |
| % by weight of FKM, based on total rubber | 0 | 48.8 | 76.9 | 100 |
| F [MPa] | 20.6 | 19.8 | 14.4 | 10.5 |
| D [%] | 380 | 290 | 360 | 390 |
| M$_{50}$ [MPa] | 3.0 | 3.5 | 2.7 | 2.5 |
| M$_{100}$ [MPa] | 5.2 | 5.6 | 4.1 | 3.2 |
| H$_{RT}$ [Shore A] | 75 | 77 | 74 | 72 |
| ΔO, Swelling in ASTM fuel O, RT, 7 days; [% by weight.] [%] | 50 | 30 | 19 | — |
| Tor max [°C.] [%] | −13 | −8 | −6 | −3 |

We claim:

1. Mixtures comprising (a) from 95 to 5% by weight of a fluoroelastomer and (b) from 5 to 95% by weight of an elastomer which contains nitrile groups and has from 25 to 140 nitrile-nitrogen atoms and less than 35 double bonds per 1000 carbon atoms, the percentages relating to the total of (a) and (b).

2. Mixtures according to claim 1 of from 70 to 10% by weight of (a) and from 30 to 90% by weight of (b).

3. Mixtures according to claim 1, in which (b) contains less than 12 double bonds per 1000 carbon atoms.

4. Mixtures according to claim 1, in which (b) contains less than 2 double bonds per 1000 carbon atoms.

5. Co-vulcanisates produced from the mixtures according to claim 1 by peroxidic cross-linking or by radiation cross-linking.

* * * * *